United States Patent
Milos

(10) Patent No.: US 9,619,179 B2
(45) Date of Patent: Apr. 11, 2017

(54) DATA STORAGE APPARATUS USING SEQUENTIAL DATA ACCESS OVER MULTIPLE DATA STORAGE DEVICES

(75) Inventor: Grzegorz Milos, Romford (GB)

(73) Assignee: Apple Inc., Cupertino, CA (US)

( * ) Notice: Subject to any disclaimer, the term of this patent is extended or adjusted under 35 U.S.C. 154(b) by 70 days.

(21) Appl. No.: 14/118,438

(22) PCT Filed: May 24, 2012

(86) PCT No.: PCT/GB2012/051177
§ 371 (c)(1),
(2), (4) Date: Mar. 26, 2014

(87) PCT Pub. No.: WO2012/160388
PCT Pub. Date: Nov. 29, 2012

(65) Prior Publication Data
US 2014/0297943 A1    Oct. 2, 2014

(30) Foreign Application Priority Data

May 24, 2011   (GB) .................................. 1108638.6

(51) Int. Cl.
*G06F 13/12*  (2006.01)
*G06F 13/00*  (2006.01)
*G06F 3/06*   (2006.01)

(52) U.S. Cl.
CPC ............ *G06F 3/0665* (2013.01); *G06F 3/065* (2013.01); *G06F 3/0611* (2013.01);
(Continued)

(58) Field of Classification Search
CPC .... G06F 3/0665; G06F 3/0619; G06F 3/0613; G06F 3/0689; G06F 3/0611; G06F 3/065
See application file for complete search history.

(56) References Cited

U.S. PATENT DOCUMENTS 5,893,919 A * 4/1999 Sarkozy et al. ............... 711/114
6,076,143 A * 6/2000 Blumenau ..................... 711/114
(Continued)

FOREIGN PATENT DOCUMENTS

EP    1 498 831    1/2005

OTHER PUBLICATIONS

"Randomized data allocation in scalable streaming Architectures" by Kun Fu and Roger Zimmermann, DASFAA 2005, LNCS 3453, pp. 474-486.*

(Continued)

*Primary Examiner* — Jing-Yih Shyu
(74) *Attorney, Agent, or Firm* — Blakely, Sokoloff, Taylor & Zafman LLP

(57) ABSTRACT

Data Storage Apparatus An apparatus (1) for storing data comprises a plurality of physical data storage disks (2). Each of the physical data storage disks (2) is divided into a plurality of sub-regions (3). The apparatus also comprises data processing means (4) configured such that: the data to be stored is divided into a plurality of data blocks, a plurality of copies of the plurality of data blocks is made and each copy is labelled with a distinct identifier, and assigned to the plurality of sub-regions (3) such that: (a) each copy of any given data block is assigned to a different physical data storage disk (2), and (b) none of the plurality of data blocks with a first identifier is assigned to the same sub-region (3) as any of the plurality of data blocks with a second identifier, for any pair of distinct identifiers.

21 Claims, 2 Drawing Sheets

(52) U.S. Cl.
CPC .......... *G06F 3/0613* (2013.01); *G06F 3/0619* (2013.01); *G06F 3/0689* (2013.01)

(56) References Cited

U.S. PATENT DOCUMENTS

| | | | |
|---|---|---|---|
| 6,233,648 B1* | 5/2001 | Tomita | 711/4 |
| 6,408,359 B1* | 6/2002 | Ito | H04N 7/17336 |
| | | | 348/E7.073 |
| 7,406,484 B1* | 7/2008 | Srinivasan et al. | |
| 2002/0046328 A1* | 4/2002 | Okada | 711/151 |
| 2003/0225899 A1* | 12/2003 | Murphy | 709/230 |
| 2005/0015566 A1* | 1/2005 | Zohar et al. | 711/203 |
| 2009/0077327 A1* | 3/2009 | Hara | 711/154 |

OTHER PUBLICATIONS

"Design and Implementation of a Resource-Efficient Storage Server for VoD" by Yung Ryn Choe, PhD Dissertation Purdue University, May 2007.*
"Reconciling Simplicity and Realism in Parallel Disk Models" by Peter Sanders, Parallel Computing, vol. 28, Issue 5, May 2002, pp. 705-723.*
"Algorithms for Scalable Storage Servers", by Peter Sanders, SOFSEM 2004, LNCS 2932, pp. 82-101, 2004.*
"Optimal Distributed Declustering Using Replication" by Keith B. Frikken, ICDT 2005, LNCS 3363, pp. 144-157, 2005.*
"A Pipeline IP Lookup Architecture with Random Duplicate Allocation" by Yi Wu and Ge Nong, © 2012 IEEE.*
Sanders et al., "Fast Concurrent Access to Parallel Disks", SODA '00 Proceedings of the eleventh annual ACM-SIAM symposium on discrete algorithms, pp. 849-858, 2000.

* cited by examiner

| Logical block # | 1 | 2 | 3 | 4 | 5 | 6 |
|---|---|---|---|---|---|---|
| Copy 1, physical location | | | | | | |
| Copy 2, physical location | | | | | | |

Fig. 2a

| Logical block # | 1 | 2 | 3 | 4 | 5 | 6 |
|---|---|---|---|---|---|---|
| Copy 1, physical location | B0 | A0 | C0 | | | |
| Copy 2, physical location | C5 | B5 | A5 | | | |

Fig. 2b

| Logical block # | 1 | 2 | 3 | 4 | 5 | 6 |
|---|---|---|---|---|---|---|
| Copy 1, physical location | B0 | A0 | C0 | A1 | C1 | B1 |
| Copy 2, physical location | C5 | B5 | A5 | B6 | A6 | C6 |

Fig. 2c

DATA STORAGE APPARATUS USING SEQUENTIAL DATA ACCESS OVER MULTIPLE DATA STORAGE DEVICES

CROSS-REFERENCE TO RELATED APPLICATIONS

This application is a U.S. National Phase Application pursuant to 35 U.S.C. §371 of International Application No. PCT/GB2012/051177, filed on May 24, 2012, which is incorporated by reference in its entirety and published as WO 2012/160388 on Nov. 29, 2012, and which also claims priority to GB 1108638.6, filed on May 24, 2011.

FIELD

This invention relates to methods and apparatus for data storage. In particular, this invention relates to methods and apparatus for data storage using sequential data access over multiple data storage disks.

BACKGROUND OF THE DISCLOSURE

In a data storage array comprising multiple hard disks, random duplicate allocation (RDA), e.g. as described by Sanders et al in "Fast concurrent access to parallel disks", SODA '00 Proceedings of the eleventh annual ACM-SIAM symposium on discrete algorithms, pp 849-858, is a technique for allocating data to a disk redundantly and randomly so as to avoid the possibility that a small number of the disks will become disproportionately heavily loaded compared to the rest, which could bottle-neck the performance.

In a standard deployment of RDA, requests for large objects, which comprise many blocks, may not map to a set of parallel sequential I/Os from all disks in the array. As a result, the full sequential bandwidth of the array is not generally achieved. In fact, for standard block sizes, the seek time is usually greater than the data transfer. Therefore, a standard RDA layout achieves no better than half the sequential bandwidth for large reads. To see this, consider a three disk 2-RDA array, with a single 6 MB record written to it, which is subdivided into 1 MB blocks. Table 1 below shows an example RDA layout for that record. "Xn" denotes location of a physical block, "X" is the disk label from set of A, B and C, and "n" is the block number.

TABLE 1

| | Logical block # | | | | | |
|---|---|---|---|---|---|---|
| | 1 | 2 | 3 | 4 | 5 | 6 |
| Copy 1, physical location | B4 | A1 | A2 | C1 | B3 | A6 |
| Copy 2, physical location | A3 | C2 | B2 | A4 | A5 | C3 |

Suppose that the average seek time for a block plus the rotational latency is the same as the block data transfer time. For simplicity of calculations let this time equal 1 unit. Read and write operations will now be considered separately. For reads, the theoretical optimum is to read two sequential blocks from each of the three disks (A, B, C) in parallel. This would take 3 time units (including the initial seek). A basic algorithm which reads each logical block one by one, would take 6 units for data transfer plus 6 units for seeks, divided by 3, if the load is shared equally between all physical disks and they are accessed in parallel. 4 time units is equivalent to 75% of the array bandwidth. A more optimal algorithm could look ahead in the logical block space and detect the opportunity to read logical block 2 and 3 in sequence from physical disk A, logical block 3 and 5 from disk B and finally logical block 4, 5 and 6 from disk A. However, it is undesirable to take advantage of both sequential reads from disk A since this would put too much load on this one disk. Also, the sequence on disk B overlaps in the logical address space with the two sequences on disk A. Reading overlapping sequences would read duplicates for some of the logical blocks. Therefore, the algorithm would schedule a sequential read for a two block subsequence (from disk A or B), and let that disk complete its I/O one time unit earlier (due to one removed seek). This improves the average array bandwidth to around 82%. An optimal algorithm, which considers the entire record and buffers up logical blocks read ahead of time, could remove yet another seek (for example by reading A1, A2; B3, B4; C1, C3), improving the bandwidth to 90%. However, there is no way to achieve the full bandwidth for that particular layout. Also the optimal algorithm relies on O(record size) buffers, and may not bring the first logical block until the very last block read.

For write, similarly to reads, the naive algorithm which writes each logical block at a time would fail to take advantage of possible sequential writes, except of the sequence A1-A2. The lookahead algorithm would write the following sequentially: A1-A2, B2-B3 and A4-A6. Finally, the optimal, reordering algorithm could dispatch sequences A1-A6, B2-B4, C1-C3. However, this suffers from two major disadvantages: first, the entire record may have to be available ahead of the write and second, the loads handled by each of the disks may not be equal. In the above example disk A stores significantly more of the record than disk B and C.

SUMMARY OF THE DESCRIPTION

The present invention aims to provide an improved method and apparatus for storing data.

When viewed from a first aspect the invention provides a method of storing data in a system comprising a plurality of physical data storage disks, the method comprising the steps of:
  (i) dividing each of the plurality of physical data storage disks into a plurality of sub-regions,
  (ii) dividing the data to be stored into a plurality of data blocks, making a plurality of copies of the plurality of data blocks, and labelling each of said plurality of copies with a distinct identifier,
  (iii) assigning the plurality of data blocks to the plurality of sub-regions such that:
    (a) each copy of any given data block is assigned to a different physical data storage disk, and
    (b) none of the plurality of data blocks with a first identifier is assigned to the same sub-region as any of the plurality of data blocks with a second identifier, for any pair of distinct identifiers.

In general, the identifiers with which the plurality of copies are labeled will be a number, e.g. copy number i or j. The plurality of copies may therefore by numbered with a copy number, e.g. 1 to k, where k is the desired redundancy factor, i.e. the number of copies made of the data blocks. However, other labeling or numbering systems could be used.

When viewed from a second aspect the invention provides an apparatus for storing data, the apparatus comprising a plurality of physical data storage disks, wherein each of the physical data storage disks is divided into a plurality of sub-regions;

wherein the apparatus comprises data processing means configured such that:

the data to be stored is divided into a plurality of data blocks, a plurality of copies of the plurality of data blocks is made and each copy is labeled with a distinct identifier, and assigned to the plurality of sub-regions such that:

(a) each copy of any given data block is assigned to a different physical data storage disk, and (b) none of the plurality of data blocks with a first identifier is assigned to the same sub-region as any of the plurality of data blocks with a second identifier, for any pair of distinct identifiers.

Thus it will be appreciated that the physical blocks are chosen in a way that preserves the advantages of standard RDA, but makes it possible to schedule sequential or nearly sequential I/Os. This is achieved by first subdividing each physical disk into k smaller "virtual" disks (where k is the desired redundancy factor). This guarantees that I/O sequential on a virtual disk, is also sequential on the physical disk. Second, space from virtual disks is always allocated in units of "super-blocks" which are big enough to amortize the cost of a seek. Finally, randomness is introduced when building the record map by permuting a carefully chosen set of physical blocks.

When storing a data record to an array, it is first subdivided into "logical block", with each of these blocks being assigned to a "physical block" on a disk. Preferably the disk to which the logical block is assigned is chosen at random, i.e. the assignment of data blocks in step (iii) is otherwise random. Additional copies of the block are assigned to other disks, which again may be randomly selected.

In this "k-RDA", k copies are made of each logical block, and clearly there are variants in which different disks may receive different numbers of copies. Additionally, the physical blocks may be chosen at random from the set of free blocks on an appropriate disk. Reading the data record back from storage requires each of the logical blocks to be read. For each block, there is a choice of k disks to read it from, and this flexibility allows better load balancing across disks than more traditional RAID redundancy schemes.

The block size is generally chosen to match the characteristics of the underlying hardware, e.g. for spinning magnetic disks it is generally smaller than 1 MB. This allows the I/O load sharing between a greater number of disks even for relatively small records. Note that for records smaller or equal to one block, only k disks can be used.

In one set of embodiments the data blocks are assigned in sets of size n, wherein n is the number of physical data storage disks in the system, and for each copy of the plurality of data blocks a random permutation of the physical data storage disks is chosen, and each of the plurality of data blocks is assigned in turn to the corresponding entry in the permutation. These permutations introduce the randomness required to spread the load between physical disks. Preferably the permutation for the plurality of data blocks with copy number j is the rotation of the permutation for the plurality of data blocks with copy number (j-1). Where the copy number is a non-numeric identifier, the identifier (j-1) is the identifier before identifier j in the list of identifiers.

In one set of embodiments the assignment of the plurality of data blocks to the plurality of sub-regions is arranged to provide fast sequential access. For example the blocks are provided close to the edge of the disk, so as to obtain a faster sequential read speed than if they were closer to the spindle.

When assembling a record, each of the plurality of sub-regions may be divided into a plurality of "super-blocks", wherein a data block assigned to a given sub-region is allocated space sequentially within a super-block. The size of the super-block amortizes the seek incurred when starting an I/O to/from the entire super-block.

In one set of embodiments, the number of sub-regions per physical data storage disk is equal to the number of copies of the plurality of data blocks, and wherein data blocks with copy number i are allocated to the i-th sub-region on a given physical data storage disk. Alternatively, the number of sub-regions per physical data storage disk is equal to the least common multiple V of a fixed number of redundancy levels k_1, k_2, . . . , k_n, and wherein the i-th copy of the j-th data block when storing data with k copies is (k.j+i) mod V, wherein k is a divisor of the least common multiple V.

The plurality of sub-regions to which the first copies of the plurality of data blocks are assigned may be identified as primary sub-regions, wherein the primary sub-regions comprise the parts of the plurality of physical data storage disks for which sequential access is fastest, and wherein read requests are directed preferentially to the primary sub-regions. Preferably, the plurality of physical data storage disks comprise one or more rotating disks and/or one or more hard-drives, wherein the primary sub-regions are located on the outer edge of the plurality of physical data storage disks.

BRIEF DESCRIPTION OF THE DRAWINGS

An embodiment of the invention will now be described by way of example with reference to the accompanying drawings.

FIGS. 2a, 2b and 2c show an example of a data record being built in accordance with the invention.

DETAILED DESCRIPTION

Figure 1:
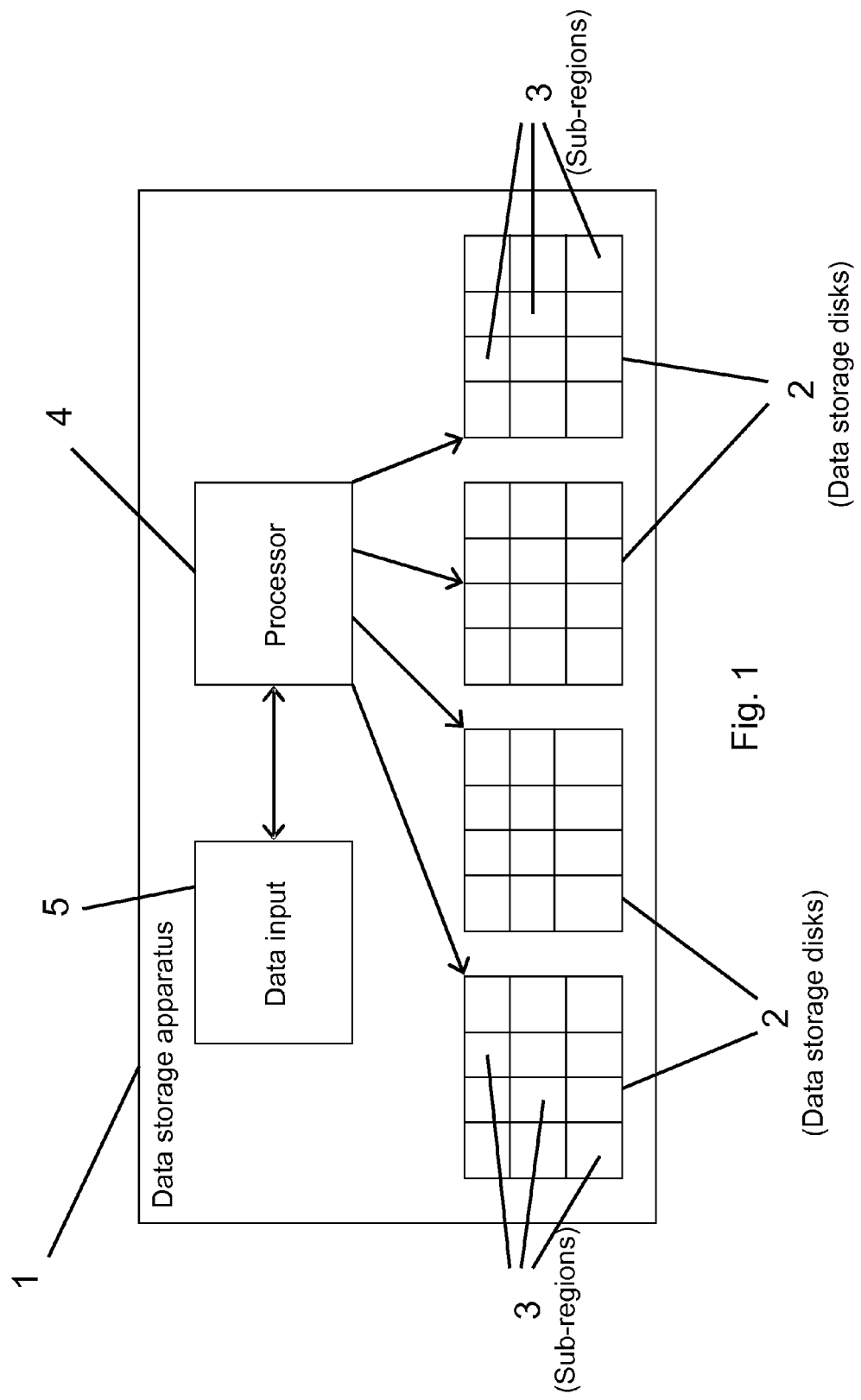
FIG. 1 shows an embodiment of a data storage apparatus in accordance with the present invention.

The apparatus 1 for storing data includes multiple physical data storage disks 2, e.g. a disk array, as shown in FIG. 1. Four disks are shown in FIG. 1, but many more could be provided. Each of the physical data storage disks 2 are divided into a number of sub-regions 3. The apparatus also includes a processor 4 which interacts with a data input 5 in order to assign the data to be stored to the physical data storage disks 2 in accordance with the invention.

The following algorithm gives a description of how a data record is assembled across the multiple physical data storage disks 2. Let "n" be the record size in blocks, "s" the super-block size, "k" the redundancy factor, "sigma(A, x)" the x-th element of a permutation of set A, "D" the set of physical data storage disks 2 and "D_x" the x-th virtual disk on disk D, i.e. one of the sub-regions 3 of the physical data storage disks 2.

1. Allocate a single super-block, S_D_x, from each of the sub-regions 3 on each of the physical data storage disks 2.
2. Compute a random permutation, sigma, of the set of disks D.
3. Compute k rotations, sigma_i, of sigma. The rotation for a given index i is such that sigma(D, x)=sigma_i(D, (x+i) mod |D|).
4. Build the map for |D| logical blocks in a batch, using {sigma_i} as follows:
    1. For the first logical block, construct a list of the first elements of each sigma_i. More formally, let d_i=sigma_i(D, 0) for each i in 0 . . . k-1.

2. For each d_i, first find the preallocated super-block S_(d_i)_i.
3. Allocate a single block from that super-block, and use it to store the i-th copy of the first logical block.
4. Repeat the above subsequence IDI times in total, until rotations sigma_i run out.
5. Reallocate a super-block from a given sub-region 3 whenever it gets used up fully.

The above algorithm satisfies the following key properties:

1. Permutations introduce randomness required to spread the load between physical data storage disks 2.
2. Rotations guarantee that the k copies used for a given logical block will use k different physical data storage disks 2.
3. Each copy uses its own sub-region 3, which gives good I/O sequentially, as shown below.
4. The size of the super-block amortizes the seek incurred when starting an I/O to/from the entire super-block.

The following example shows how a six-block record can be built using the above algorithm for k=2, on three disks A, B, C. Suppose that each disk 2 has ten blocks, subdivided into two five-block sub-regions 3 (blocks 0-4 and 5-9 inclusive).

Starting with an empty map as shown in FIG. 2a which shows the six block records 10, for which two copies 11, 12 are going to be made, i.e. because k=2. Super-blocks of size 2 from each of the sub-regions 3 are allocated for each of the physical data storage disks 2. Suppose the allocator returned super-blocks at the beginning of each sub-region 3, i.e. blocks 0-1 or 5-6 respectively.

A permutation of the set of disks {A, B, C} is made, e.g. {B, A, C}. The only other rotation required {C, B, A} is also computed. The map for the 1-3 logical blocks can now be built, using the appropriate super-blocks to allocate physical space, as is shown in FIG. 2b. This shows that copy 1 of logical block 1 has been allocated to virtual disk B0 (e.g., location 0 on physical disk B), copy 1 of logical block 2 has been allocated to A0, copy 1 of logical block 3 has been allocated to C0, copy 2 of logical block 1 has been allocated to C5, copy 2 of logical block 2 has been allocated to B5, and copy 2 of logical block 3 has been allocated to A5. Thus it will be seen that the logical blocks 1-3 of copy 1 have been allocated to the physical disks in the order {B, A, C} and copy 2 to the rotation {C, B, A}.

Following this, another permutation of the disk set is chosen, e.g. {A, C, B}. The corresponding rotation is {B, A, C}. This then determines the allocations of logical blocks 4-6 as shown in FIG. 2c, to complete the record map. It should now be clear that both reads and writes can be performed sequentially. Moreover only small buffers O(|D|) in size are required to perform the I/O.

The optimal policy is to read the primary copies of each block. In general certain virtual disks (e.g., sub-regions) can be chosen to be identified as primary (up to 1/k of each real disk) and these can be used preferentially for primary copies. Then most reads go to primary virtual disks, which can be located to as to optimize performance; optionally and preferably primary virtual disks are located:

1. close to each other, so as to reduce seek time between them,
2. close to the edge of the disk, so as to obtain faster sequential read speed than if they were closer to the spindle,
3. in general for a medium with different performance characteristics depending on which physical part of the medium is used for storage, primary virtual disks are put in the fastest or most favored locations.

The invention claimed is:

1. A method of storing data in a system comprising multiple physical data storage devices, the method comprising:
    dividing each of the multiple physical data storage devices into multiple sub-regions, wherein each physical data storage device includes the multiple sub-regions;
    dividing the data to be stored into multiple data blocks;
    making multiple of copies of each of the multiple data blocks; and
    assigning the multiple copies of each of the multiple data blocks to the multiple physical data storage devices, wherein each copy of a data block is assigned to a different physical data storage device and for each of the multiple data blocks, assigning the multiple copies of the data block includes:
    choosing a random permutation of a data set including an identifier for each of the multiple physical data storage devices; and
    assigning each of the multiple copies to a physical data storage device based on a corresponding identifier in the random permutation, wherein assigning each of the multiple copies includes:
        assigning a first copy to a first sub-region on a first physical data storage device; and
        assigning a second copy to second, distinct sub-region on a second distinct physical data storage device.

2. The method as in claim 1, additionally comprising dividing each of the multiple sub-regions into multiple super-blocks, wherein each super-block is sized to amortize seek cost when starting an input/output operation to or from the super-block, and space within each super-block is sequentially allocated.

3. The method as in claim 2, additionally comprising assigning the multiple copies of the data blocks to multiple super-blocks, wherein for each copy of a data block, the first copy is assigned to a different super-block than the second copy.

4. The method as in claim 1, wherein assignment of each copy of the multiple data blocks is otherwise random.

5. The method as in claim 1, additionally comprising assigning the data blocks in sets having a size defined by a count of physical data storage devices in the system.

6. The method as in claim 1, wherein a count of sub-regions per physical data storage device is equal to a number of copies of the multiple data blocks, each copy of a data block is assigned an identifier value, and wherein data blocks with a given identifier value are allocated to a sub-region on a physical data storage device corresponding with the given identifier value.

7. The method as in claim 1, wherein a count of sub-regions per physical data storage device is equal to a least common multiple of a fixed number of redundancy levels and wherein a given copy of a given data block is identified based at least in part on a divisor of the least common multiple.

8. The method as in claim 1, wherein the multiple sub-regions to which a first set of copies of the multiple data blocks are assigned are identified as primary sub-regions, the primary sub-regions comprise portions of the multiple physical data storage devices for which sequential access is fastest relative to other portions of the physical data storage devices, and read requests are directed preferentially to the primary sub-regions.

9. An apparatus for storing data, the apparatus comprising:
- multiple physical data storage devices divided into multiple sub-regions, each of the multiple physical data storage devices including the multiple sub-regions;
- a data processor to divide data to be stored into multiple data blocks, copy the multiple data blocks, and assign the multiple copies of each of the multiple data blocks to the multiple physical data storage devices, wherein each copy of a data block is assigned to a different physical data storage device and for each of the multiple data blocks, the data processor is to:
- choose a random permutation of a data set including an identifier for each of the multiple physical data storage devices; and
- assign each of the multiple copies to a physical data storage device based on a corresponding identifier in the random permutation; and
- wherein to assign each of the multiple copies, the data processor is to:
  - assign a first copy to a first sub-region on a first physical data storage device; and
  - assign a second copy to second, distinct sub-region on a second distinct physical data storage device.

10. The apparatus as in claim 9, wherein each of the multiple sub-regions is divided into a multiple super-blocks, each super-block sized to amortize seek cost when starting an input/output operation to or from the super-block.

11. The apparatus as in claim 10, wherein the data blocks are to be assigned in sets having a size defined by a count of physical data storage devices.

12. The apparatus as in claim 9, wherein assignment of each copy of the multiple data blocks is otherwise random.

13. The apparatus as in claim 9, wherein a number of sub-regions per physical data storage device is equal to a number of copies of the multiple data blocks, and wherein data blocks with a given identifier value are allocated to a sub-region on a physical data storage device corresponding with the given identifier value.

14. The apparatus as in claim 9, wherein a count of sub-regions per physical data storage device is equal to a least common multiple of a fixed number of redundancy levels and wherein a given copy of a given data block is identified based at least in part on a divisor of the least common multiple.

15. The apparatus as in claim 14, wherein the least common multiple is defined as V, an i-th copy of a j-th data block, when storing data with k copies, is defined as (k.j+i) mod V, wherein k is a divisor of the least common multiple V.

16. The apparatus as in claim 9, wherein the multiple sub-regions to which a first set of copies of the multiple data blocks are assigned are identified as primary sub-regions, and wherein the primary sub-regions comprise portions of the multiple physical data storage devices for which sequential access is fastest relative to other portions of the physical data storage devices, and wherein read requests are directed preferentially to the primary sub-regions.

17. A system comprising:
- multiple physical data storage devices divided into multiple sub-regions, each of the multiple sub-regions divided into multiple super-blocks, and each of the multiple super-blocks are configured to store multiple data blocks; and
- a data processor configured to:
  - divide each of the multiple physical data storage devices into the multiple sub-regions and the multiple super-blocks, each physical data storage device including the multiple sub-regions and the multiple super-blocks;
  - make multiple copies of each of the multiple data blocks; and
  - assign the multiple copies of each of the multiple data blocks to the multiple physical data storage devices, wherein each copy of a data block is assigned to a different physical data storage device and for each of the multiple data blocks and the data processor is to:
    - choose a random permutation of a data set including an identifier for each of the multiple physical data storage devices; and
    - assign each of the multiple copies to a physical data storage device based on a corresponding identifier in the random permutation; and
  - wherein to assign each of the multiple copies, the data processor is to:
    - assign a first copy to a first sub-region on a first physical data storage device; and
    - assign a second copy to second, distinct sub-region on a second distinct physical data storage device.

18. The system as in claim 17, wherein the data processor is further to assign data blocks in sets having a size defined by a count of physical data storage devices.

19. The system as in claim 17, wherein read requests to the multiple physical data storage devices are to be directed preferentially to primary sub-regions on the multiple physical data storage devices, the primary sub-regions comprising portions of the multiple physical data storage devices for which sequential access is faster relative to other portions of the physical data storage devices.

20. The system as in claim 17, wherein assignment each copy of the multiple data blocks is otherwise random.

21. The system as in claim 17, wherein a data block stored in a given sub-region is allocated space sequentially within the super-block that stores the data block and the super-block is sized to amortize seek cost during an input/output operation associated with the super-block.

* * * * *